United States Patent [19]

Richards

[11] Patent Number: 4,735,386
[45] Date of Patent: Apr. 5, 1988

[54] SIDE-LOAD TYPE PIPE HANGER WITH SINGLE BOLT CLOSURE AND BOLT RETAINED LINER

[76] Inventor: Peter S. Richards, 100 Mt. Si Pl., NW., Issaquah, Wash. 98027

[21] Appl. No.: 927,443

[22] Filed: Nov. 6, 1986

Related U.S. Application Data

[63] Continuation-in-part of Ser. No. 730,285, May 3, 1985.

[51] Int. Cl.$^4$ .............................................. F16L 3/08
[52] U.S. Cl. ...................................... 248/62; 248/74.1
[58] Field of Search ................ 248/62, 63, 65, 74.1, 248/74.4, 72; 411/166

[56] References Cited

U.S. PATENT DOCUMENTS

| 628,297 | 7/1899 | Barr | 411/166 |
|---|---|---|---|
| 1,031,851 | 7/1912 | January . | |
| 1,579,418 | 4/1926 | Tomkinson . | |
| 1,619,768 | 3/1927 | Schubert . | |
| 1,698,571 | 1/1929 | Van Cleve | 248/62 |
| 1,850,275 | 3/1932 | Zifferer . | |
| 2,762,592 | 9/1956 | Adams, Jr. | 248/59 |
| 2,762,598 | 9/1956 | Runge | 248/327 |
| 2,784,930 | 3/1957 | Wernecke | 248/300 |
| 2,846,169 | 8/1958 | Sullivan | 248/62 |
| 2,936,991 | 5/1960 | Picha et al. | 248/343 |
| 3,034,753 | 5/1962 | Johnston et al. | 248/59 |
| 3,265,340 | 8/1966 | Attwood | 248/62 |
| 3,273,838 | 9/1966 | Fletcher et al. | 248/62 |
| 3,404,858 | 10/1968 | Levy | 248/74.1 |
| 3,506,227 | 4/1970 | Jenkins | 248/59 |
| 3,517,901 | 6/1970 | Jenkins | 248/59 |
| 4,267,994 | 5/1981 | Lynch | 248/74.1 |
| 4,305,557 | 12/1981 | Kowalski | 248/62 |
| 4,318,518 | 3/1982 | Davis | 248/74.3 |
| 4,461,440 | 7/1984 | Heath | 248/59 |

FOREIGN PATENT DOCUMENTS

| 13267 | 10/1925 | Netherlands | 21/51 |
|---|---|---|---|
| 152388 | 11/1955 | Sweden . | |
| 488960 | 7/1938 | United Kingdom . | |

Primary Examiner—Reinaldo P. Machado
Assistant Examiner—Alvin Chin-Shue
Attorney, Agent, or Firm—Delbert J. Barnard

[57] ABSTRACT

A bolt (30) is inserted threaded end (50) first upwardly through a first opening (42) within a lower arm portion (16) of a C-shaped saddle (10), then through an opening (46) in a liner (22), then through a larger opening (46) in the upper arm portion (18) of the saddle (10). The opening (44) is hexagonal in shape. A nut (52) is then installed on the bolt (30). The nut (52) has a small end portion (54) which is hexagonal in shape. The nut (52) is hand tightened and then is aligned with the opening (44) so that the small end portion (54) would drop into the opening (44). A wrench is then used on the head (48) of the bolt (30) for rotating the bolt (30) for the purpose of drawing the nut (52) and bolt (30) together and applying a clamping force on a pipe (32) which is in the saddle (10). The liner (22) extends along the inside of the bolt (30) and then extends about the pipe (32), between it and the bight of the saddle (10), and then extends along the inside of the upper arm portion (18).

1 Claim, 2 Drawing Sheets

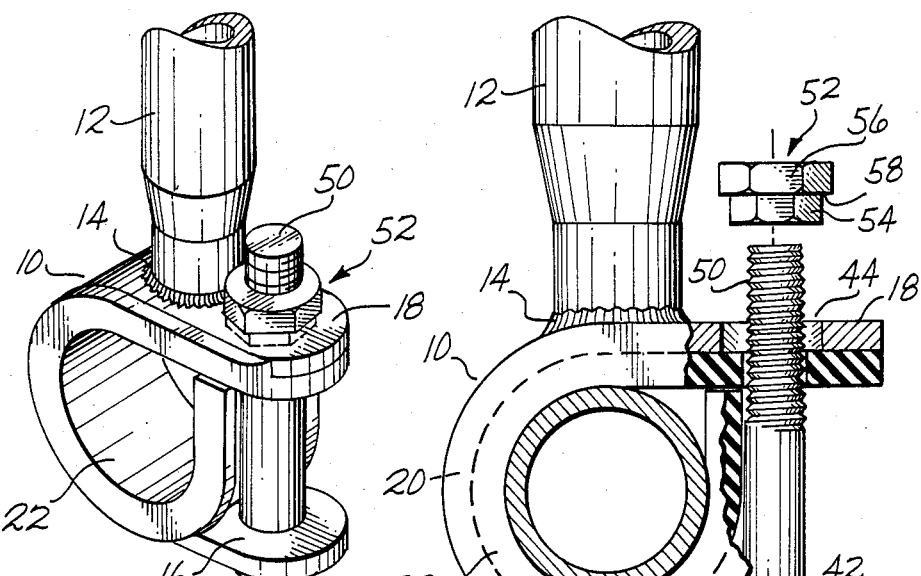
Fig.1
Fig.2
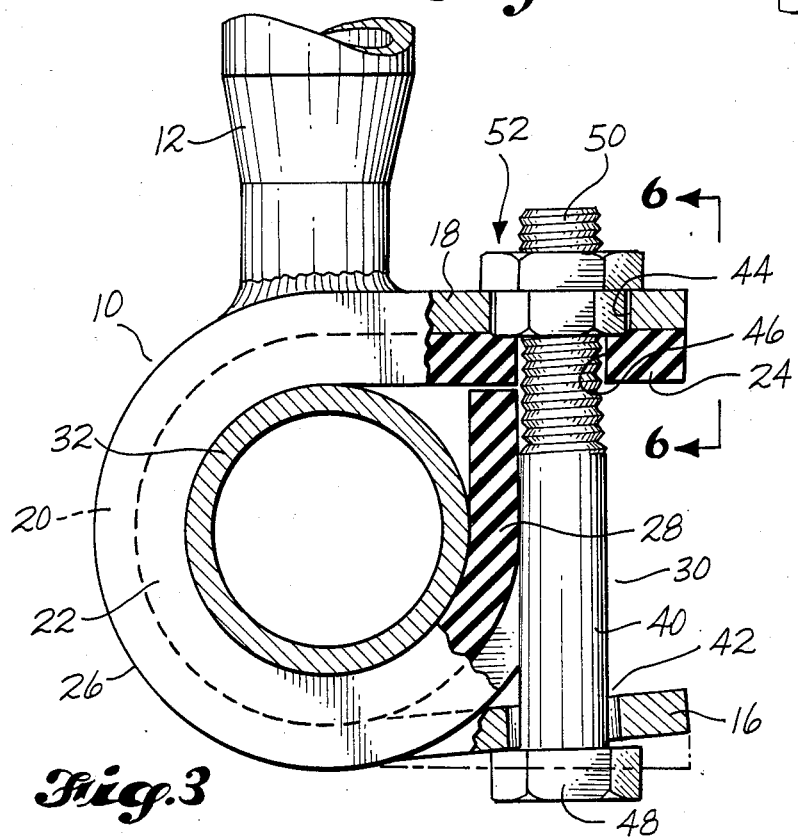
Fig.3

SIDE-LOAD TYPE PIPE HANGER WITH SINGLE BOLT CLOSURE AND BOLT RETAINED LINER

RELATED APPLICATION

This is a continuation-in-part of my copending application Ser. No. 730,285, filed May 3, 1985, and entitled "Side-Load Type Pipe Hanger With Single Bolt Closure."

TECHNICAL FIELD

This invention relates to pipe hangers. More particularly, it relates to an improved side-load type pipe hanger and a manner of securing a liner in place within such hanger.

BACKGROUND ART

The present invention relates to an improvement of the pipe hanger disclosed by my application Ser. No. 730,285. Such pipe hanger is itself an improvement of the pipe hanger disclosed by U.S. Pat. No. 3,517,901, granted June 30, 1970, to John C. Jenkins, known as a Side-Load Type Hanger.

The disclosed subject matter of my copending application Ser. No. 730,285 is prior art with respect to this application for the reason that such subject matter was put on sale in the Summer of 1985.

DISCLOSURE OF THE INVENTION

The side-load type pipe hanger of the present invention is basically characterized by a generally C-shaped saddle, a liner for the saddle in which the pipe is received, and a single closure bolt which extends through an opening in the liner and positively secures the liner to the saddle.

The saddle comprises a pair of spaced apart arm portions and an interconnecting bight portion, together defining a space for receiving a pipe section. The pipe section is side loaded into the space. A support leg is connected to the saddle.

A bolt is provided which comprises a rod body, and an enlarged head at a first end of said rod body, and a threaded end portion at a second end of the rod body. A nut is provided which includes a central opening that is threaded with threads which compliment the threads on the bolt. The nut has a small sized first end portion having a cross sectional shape that is other than circular, and a large size second end portion.

A first opening is formed in one of the arm portions. This opening is smaller in size than the head of the bolt but is larger in size than the rod body of the bolt. The rod body of the bolt is sized to make a loose fit in the first opening. A second opening is provided in the second arm portion. The second opening is substantially larger in size than the rod body of the bolt, enabling the rod body to fit loosely in the second opening. The second opening is smaller in size than the second end portion of the nut. It is sized and complimentary shaped to snugly receive the small sized first end portion of the nut.

A liner is provided for the space in the saddle. The liner has a web portion adapted to contact one of the arm portions and the bight portion of the saddle and also contact the rod body portion of the bolt. A liner includes side flanges which extend from the web into positions outwardly of the sides of the arms and bight portions of the saddle and outwardly of the side portions of the bolt. The web portion of the liner also makes contact with the pipe section and substantially fills a space that is outwardly of the pipe section, between it and said side portion and bight portion of the saddle, and said rod body of the bolt. The liner includes an opening in its web for receiving the rod body of the bolt.

In accordance with the invention, a pipe section and a liner are placed into the C-shaped saddle. The bolt is then inserted threaded end portion first through the first opening, then through the opening in the web of the liner, then through the second opening. Then the nut is applied to the bolt with its small size first end portion directed towards the second opening. The nut is partially screwed on to the bolt. Then the bolt is moved endwise to place the small size first end portion of the nut snugly within the second opening. Then the head of the bolt is rotated for drawing the nut and bolt together for applying a clamping force on the liner and the pipe section within the liner. The fit of the small size first end portion of the nut within the second opening serves to hold the nut against rotation while the bolt is being rotated. The pipe hanger can be transported with the liner in place, and with the nut and bolt assembly installed. The rod body of the bolt extends through the opening of the web of the liner and this serves to secure the liner to the hanger during transportation and other handling of the hanger prior to its installation.

Preferably, the support leg is connected to the second arm portion. This serves to position the nut on the same side of the C-shaped saddle as the support leg member. Preferably, the support leg member is welded to the second arm portion. The snug engagement of the small end of the nut within the second opening, backed by the large end of the nut, results in the nut and bolt assembly substantially stiffening the second arm portion of the saddle as the nut and bolt assembly are drawn together. As a result, at least most bending will occur within the first arm portion.

Other more detailed features of the invention are hereinafter described as a part of the description of the best mode of the invention. These features, and other advantages and characteristics of the invention will be apparent from the various embodiments of the invention which are illustrated and described below in connection with the drawing.

BRIEF DESCRIPTION OF THE DRAWING

Like reference numerals are used to designate like parts throughout the several views of the drawing, and:

FIG. 1 is a fragmentary pictorial view of an embodiment of the invention, taken from above and looking towards one side and the open end of the pipe receiving saddle;

FIG. 2 is an enlarged scale side elevational view of the pipe hanger shown by FIG. 1, with the nut in spaced alignment with the threaded portion of the bolt, prior to installation of the nut on the bolt, and with the liner in place and a pipe section within the liner;

FIG. 3 is a side elevational view on yet a larger scale, showing the nut installed and showing how the lower arm portion of the saddle is influenced to bend, and the upper arm portion of the saddle is restrained against bending, by the nut bolt assembly and its relationship to the two holes in the two arm portions of the saddle;

BEST MODE FOR CARRYING OUT THE INVENTION

Figure 4:
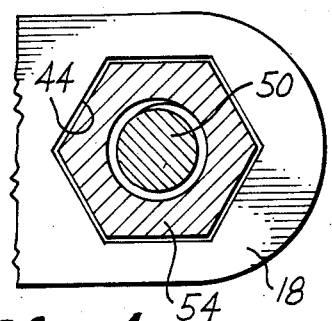
FIG. 4 is a sectional view taken substantially along line 4—4 of FIG. 5.

Referring to FIGS. 1-6, the embodiment of the invention that is shown comprises a saddle 10 which in basic configuration may be like saddle 52 of the prior art hanger disclosed by the aforementioned U.S. Pat. No. 3,517,901. The saddle 10 may be supported by a support leg 12 which is welded at its lower end, at region 14, to an upper portion of the saddle 10. Saddle 10 includes a first or lower arm portion 16, a second or upper arm portion 18, and an interconnecting bight portion 20.

Figure 6:
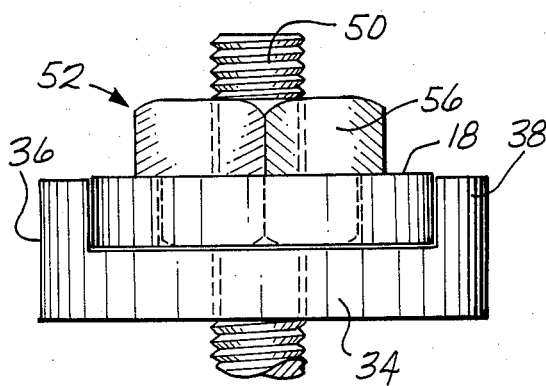
FIG. 6 is a fragmentary end view taken from the aspect of line 6—6 of FIG. 3.

A liner 22 is received within the inner space of the saddle. In accordance with the invention, the liner has an elongated side portion 24 which extends along arm portion 18 of the saddle 10, a rounded bight portion 26 which extends around the bight portion 20 of the saddle 10, and a shorter side portion 28 which extends along side of a bolt 30, between it and the pipe section 32. The liner 22 has a web portion 34 that is substantially as wide as the saddle members 16, 18, 20 and a pair of side flanges 36, 38 (FIG. 6). The flange side of the web 34 makes contact with the inner surfaces of the saddle arm portion 18 and the saddle bight portion 20, and a side surface of the rod body 40 of the bolt 30. The opposite side of the web 34 makes contact with about three-fourths of the surface of the pipe section 32.

A first opening 42 is provided in the lower arm portion 16. A second and larger opening 44 is provided in the upper arm portion 18. The centers of openings 42, 44 are in substantial alignment.

An opening 46 is provided in the web 34 of the liner 22. When the liner 22 is positioned in the manner illustrated, this opening 46 is in alignment with the opening 42, 44.

The bolt 30 is inserted through the openings 42, 46, 44. In addition to the rod body 40, the bolt 30 includes an enlarged head 48 at one end and a threaded portion 50 at its opposite end. The bolt 30 is adapted to mate with a nut 52.

Figure 5:
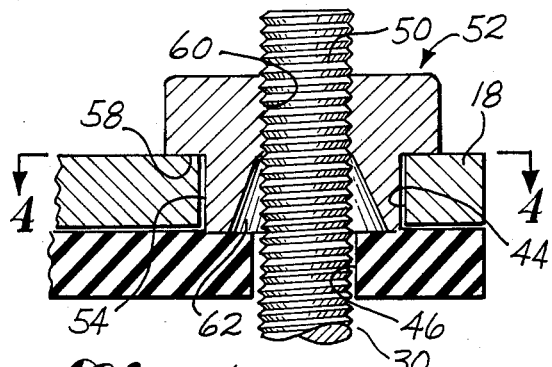
FIG. 5 is a fragmentary sectional view taken substantially along line 5—5 of FIG. 6, but showing the threaded end portion of the rod body of the bolt in side elevation.

As shown by FIGS. 2, 3 and 5, the nut 52 comprises a first small end portion 54, a second large end portion 56 and a shoulder 58 defined where the two end portions 54, 56 meet. Nut 52 includes a threaded central opening 60 having complimentary threads to the threads on threaded portion 50 of the bolt 30. Nut 52 may also include a non-threaded conical entry 62 (FIG. 5).

As shown by FIGS. 1-3, the large end portion 56 of nut 52 is hexagonal and the small end portion 54 is also hexagonal. Regarding the small end portion 54, it is only functionally important that this portion be noncircular in cross section.

The particular nut 52 that is illustrated is a known article of commerce. However, the manner in which it is used in the present invention is not known.

Figure 7:
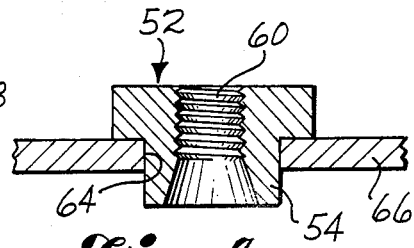
FIG. 7 is a view of a prior art nut shown inserted in a hole in a piece of sheet metal.
Figure 8:
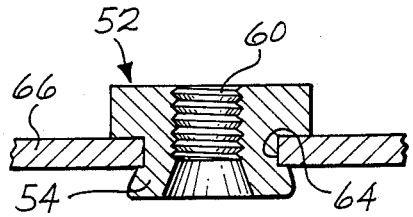
FIG. 8 is a view like FIG. 7, but showing the leading portion of the nut curled back onto the sheet metal, which is the normal installation mode.

FIGS. 7 and 8 illustrate the known use of the nut construction that is illustrated. The nut in these figures is also designated 52. A hexagonal opening 64 is formed in a sheet of sheet metal 66. Opening 64 is sized to snugly receive the small end portion 54 of the nut 52. The shoulder 58 rests against the sheet metal 66 where it immediately surrounds the opening 64. As shown by FIG. 7, the end portion 54 is sized to extend through and beyond the opening 64. Then, it is "rolled" back against the sheet metal, as shown by FIG. 8, to in this manner secure the nut 52 to the sheet metal 66.

Returning to the description of the present invention, in accordance with the present invention, the small end portion 54 of nut 52 is sized to be snugly received within the opening 44 (FIGS. 4 and 5), but there is no projecting portion which is turned over for the purpose of permanently securing the nut 52 in place. Rather, the opening 44 functions as a "box" wrench for holding the end portion 54, and hence nut 52, against turning when the end portion 54 is within the opening 44, and torque is being applied to the bolt 30.

As is clearly shown by FIGS. 2 and 3, the lower opening 42 is oversized relative to the rod body 40 of the bolt 30. Thus, the bolt 30 can be inserted upwardly through opening 42 rather quickly and easily. The openings 46, 44 are substantially larger than the upper end portion 50 of bolt 30, so it is quite easy to locate end portion 50 relative to first opening 46 and then opening 44, so the bolt 30 can be quickly inserted through these openings 46, 44.

In accordance with an aspect of the invention, the pipe section 32, and the liner 22, are moved laterally into the open throat of the saddle 10. The liner 22 may be installed first. Then the pipe section 32 may be positioned within the liner 22, and the side portion 28 of the liner bent upwardly, before the bolt 30 is installed. Or, the liner section 22 may be wrapped about the pipe section 32, and the assembly installed in the saddle 10. It makes no difference.

Then, the bolt 30 is moved upwardly through the openings 42, 46, 44. Next, the nut 52 is brought into engagement with the threaded portion 50 of the bolt 30, with the small end portion 54 directed downwardly. The conical region 62 that was formed for the purpose of adapting the end portion 54 for rolling over the sheet metal edge (FIGS. 7 and 8) now serves to guide the threaded end portion 50 of the bolt 30 into the threaded region 60 of the nut 52. The nut 52 is screwed onto the threads 50, by hand, until the nut and bolt assembly 52, 30 are joined. Then, the assembly 52, 30 is allowed to drop downwardly, to place the end portion 54 of the nut 52 into the opening 44. Opening 44 now functions as a block wrench, enabling a single wrench to be used on the bolt head 48, for rotating the bolt 30 an amount sufficient to apply the necessary squeezing or clamping force on the pipe section liner assembly 32, 22.

Referring to FIG. 3, when the nut end portion 54 is within opening 44, and the bolt 30 is tightened, something else happens. The side surfaces of nut portion 54 are moved into contact with the side surfaces of the opening 44. As the bolt head 48 and the nut 52 are drawn together, the shoulder 58 is drawn into tight engagement with the metal surrounding opening 54.

The tight fit of nut end portion 54 within the opening 44, and the pressure exerted by the shoulder 58 against the region of upper arm portion 18 which surrounds the opening 44, serves to stiffen the part of arm portion 18 which extends outwardly from the support leg 12, so that it does not want to bend. This is in contrast to the prior art hanger shown by the aforementioned U.S. Pat. No. 3,517,901 in which the end portion 68 of key 64 is rolled over the end of the upper arm portion, causing it to want to bend away from the support leg 12.

Referring back to FIG. 3, the rod body 40 of bolt 30 still makes a relatively loose fit within the opening 42. As a result, the nut and bolt assembly 52, 30 are automatically moved by the turning force on bolt 30 into a position in which the axis of the bolt 30 extends substantially perpendicular to the surface of arm portion 18 against which shoulder 58 bears. The inner surface of the bolt head 48 exerts a force on the lower arm portion 16. The lower arm portion 16 has a relatively long unsupported portion and as a result it can bend much more freely than the upper arm portion 18. Thus, the clamping pressure is applied to the pipe section and liner 32, 22 by the lower arm portion 16 bending upwardly toward the upper arm portion 18. The loose fit of bolt body 10 within opening 42 allows relative movement to occur between the bolt body 40 and the lower arm portion 16, so that bending is not apt to occur between the rod body 40 and the surfaces of opening 42, in a manner tending to resist upward deflection of arm portion 16.

The fact that there is no key which has to be rolled over the outer end of arm portion 18 makes it possible to round off the outer end portions of arm 18, eliminating sharp corners. The outer end of the lower arm portion 16 is also rounded. The fact that the engagement of the nut portion 54 within the opening 44, and the pressure of the shoulder 58 against the arm portion 18, resists bending of arm portion 18, resulting in protection for the weld 14. The weld is not likely to tear as it would if the outstanding part of arm portion 18 were to be bent downwardly.

In the illustrated embodiment, the support leg 12 is a tubular member of substantial diameter, having a reduced diameter lower end portion. The weld bead 15 extends about the circumference of the reduced diameter end portion. This circumference is relatively long, resulting in a relatively strong weld connection between the support leg 12 and the saddle 10. The reduction of the size of the lower end of the support leg 12 provides more room about the opening 14, for handling and placement of the nut 52.

It is to be understood that the support leg could be constructed in a number of different ways. It could be a single member, as illustrated, it could take one of the forms disclosed in my aforementioned U.S. application Ser. No. 730,285, it could take the two part form disclosed in my copending application Ser. No. 927,437, entitled "Pipe Hanger with Shock Load Absorbing Support Leg", and it could take many other forms as well.

In use, the pipe hangers are often subjected to very severe shock loads. As a result, it is important that the center of the support leg be kept directly above the center of the pipe section 32. For this reason, with some size pipe hangers, it is necessary to reduce the size of the lower end portion of the support leg 12, so that sufficient room exists along side of the support leg 12 to accommodate the large diameter end 56 of the nut 52.

The aforementioned U.S. Pat. No. 3,517,901 discloses a liner which extends throughout the bight region of the saddle and between the pipe section 28 and the locking bar 18. The end of the upper portion of the liner 20 is spaced from the opening in saddle leg 24 through which the walking bar 18 is inserted. A problem with this type of liner is that it can easily be separated from the rest of the hanger during transportation and handling of the hanger prior to installation. In accordance with an aspect of the present invention, the upper portion of the liner 22 is extended out to extend essentially the full length of the upper saddle arm portion 18, and a bolt receiving opening 46 is provided in the web portion 34 of the liner 22. This enables the liner to be connected to the other parts of the hanger during transportation and handling prior to assembly. The use of a nut and bolt type fastener makes this type of connection possible. It would not work with the pipe hanger disclosed by U.S. Pat. No. 3,517,901, as it is necessary to bend the locking bar 18 in order to secure it to the saddle. As shown by FIG. 1 of the drawing, when the liner 22 is within the saddle 10, and the nut and bolt assembly 52, 30 is installed, the liner 22 is very secure, even though the bolt extends through but a single opening 46. This is because the flanges 36, 38, cooperate with the nut and bolt assembly 52, 30, to not only connect the liner 22 to the upper saddle leg 18, but prevent the liner 22 from flopping around and being in a position to be damaged.

Other modifications in the construction of the hanger could be made without departing form the spirit of the invention, as defined by the following claims. The claims are to be interpreted in accordance with the established rules of claim interpretation, including use of the doctrine of equivalents.

What is claimed is:

1. A side load-type pipe hanger, comprising:
   a generally C-shaped saddle comprising a pair of spaced apart first and second arm portions and an interconnecting bight portion, together defining a space for receiving a pipe section which is side loaded into said space, and a support leg connected to the second arm portion of said saddle; and
   an improved system for securing a pipe section within the C-shaped saddle, comprising:
   a bolt comprising a rod body, an enlarged head at a first end of said rod body and a threaded end portion at a second end of said rod body;
   a nut including a central opening that is threaded with threads which complement the threads on the bolt, said nut including a small sized first end portion having a cross-sectional shape that is other than circular, and a large size second end portion;
   a first opening in said first arm portion which is smaller in size than the head of the bolt but is larger in size than the rod body of the bolt, said rod body of the bolt being sized to make a loose fit in said first opening;
   a second opening in the second arm portion, said second opening being substantially larger in size than the rod body of the bolt, so that the rod body also fits loosely in said second opening, said second opening being smaller in size than the second end portion of the nut, and being sized and complementary shaped to snugly receive the small size first end portion of the nut;
   a removable liner for the space in said saddle, said liner having a web portion extending along and contacting said second arm portion, along its full length, and along the bight portion of the saddle, and along the rod body portion of the bolt, and side flanges extending from said web into positions outwardly of the sides of the arm and bight portions of the saddle and outwardly of side portions of the bolt, wherein the web portion of said liner also makes contact with the pipe section and substantially fills a space that is radially outwardly of the pipe section, between it and said side portion and bight portion of the saddle, and said rod body of the bolt, said liner including an opening in its web for receiving the rod body of the bolt, said opening in the web being alinged with said second opening;

whereby a pipe section and said liner can be placed into said C-shaped saddle, and the bolt can be inserted threaded end portion first through the first opening, then through the opening in the web of the liner, then through the second opening, and then the nut can be applied to the bolt with its small size first end portion directed towards the second opening, and the nut can be partially screwed onto the bolt, then the bolt can be moved endwise to place the small size first end portion of the nut snugly within the second opening, and then the head of the bolt can be rotated for drawing the nut and bolt together for applying a clamping force on the liner and the pipe section within the liner, with the fit of the small sized first end portion of the nut within the second opening serving to hold the nut against rotation while the bolt is being rotated, and wherein the pipe hanger can be transported with the liner in place, and with the nut and bolt assembly installed, so that the rod body of the bolt extending through the opening in the web of the liner will secure the liner to the hanger during transportation and other handling of the hanger prior to its installation.

* * * * *